United States Patent [19]
Misker et al.

[11] Patent Number: 5,469,227
[45] Date of Patent: Nov. 21, 1995

[54] VIDEO PROCESSING SYSTEM FEATURING A CHOICE BETWEEN INTER AND INTRA FIELD PROCESSING BASED ON MOTION IN CHROMINANCE SIGNALS

[75] Inventors: Jan S. Misker; Theodora L. Hamann; Leendert T. Rozendaal, all of Eindhoven, Netherlands

[73] Assignee: U.S. Philips Corporation, New York, N.Y.

[21] Appl. No.: 148,144

[22] Filed: Nov. 4, 1993

[30] Foreign Application Priority Data

Nov. 11, 1992 [EP] European Pat. Off. ............... 92203451

[51] Int. Cl.$^6$ ..................................................... H04N 9/64
[52] U.S. Cl. ..................................................... 348/702
[58] Field of Search ..................... 358/105, 21 R; 348/699–701; H04N 7/18, 9/78, 5/14, 4/64

[56] References Cited

U.S. PATENT DOCUMENTS

| | | | |
|---|---|---|---|
| 4,546,378 | 10/1985 | Annegarn | 348/702 |
| 4,651,211 | 3/1987 | Weckenbrock et al. | 348/702 |
| 4,794,454 | 12/1988 | Sugiyama et al. | |
| 4,823,184 | 4/1989 | Belmares-Sarabia et al. | 358/21 R X |

FOREIGN PATENT DOCUMENTS 0430049  6/1991  European Pat. Off. .

*Primary Examiner*—Victor R. Kostak
*Attorney, Agent, or Firm*—Michael E. Marion

[57] ABSTRACT

In a video processing system having an intra-field processing mode which allows a better luminance-chrominance separation, and an inter-field processing mode which allows a better performance in the presence of motion in the color signals, wherein a motion-dependent choice is made between these modes, chrominance-difference signals (Ud, Vd) are derived from chrominance signals (U, V), and a first linear combination of the chrominance-difference signals (Ud', Vd) is derived when the V chrominance-difference signal (Vd) exceeds the U chrominance-difference signal (Ud'), and a second linear combination of the chrominance-difference signals (Ud', Vd) is derived in the opposite case, to obtain a motion signal (M) for the motion-dependent choice.

8 Claims, 1 Drawing Sheet

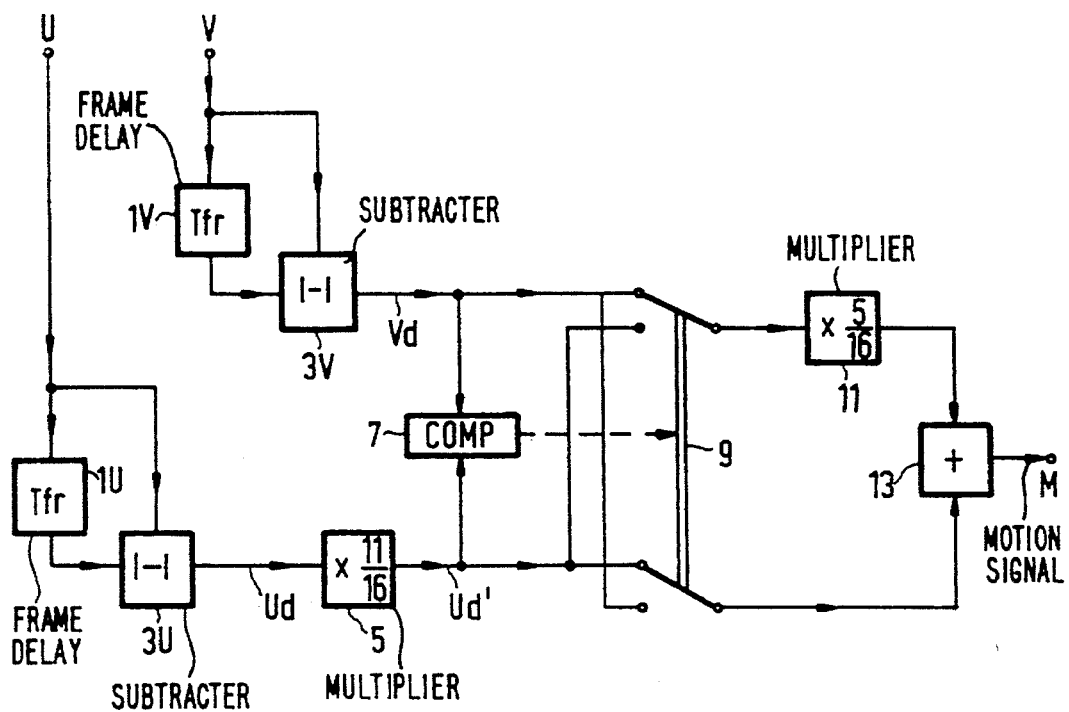

VIDEO PROCESSING SYSTEM FEATURING A CHOICE BETWEEN INTER AND INTRA FIELD PROCESSING BASED ON MOTION IN CHROMINANCE SIGNALS

BACKGROUND OF THE INVENTION

The invention relates to a video processing system, more particularly to a system in which a motion-dependent choice is made between an inter-field processing mode which allows a better luminance-chrominance separation, and an intra-field processing mode which allows a better performance in the presence of motion.

Such a video processing system has been described in the non-prepublished European patent application no. 92.202.648.9 filed on Jan. 9, 1992 (PHN 13,822). In this system, a motion detector is used which derives motion information from the luminance signal.

SUMMARY OF THE INVENTION

It is, inter alia, an object of the invention to provide a video processing system whose motion detector can very easily be manufactured and which yields better results. It is another object of the invention to provide a simple and reliable motion detector for detecting an amount of motion in chrominance signals. Therefore, a first aspect of the invention provides a method as defined in Claim 1. Another aspect of the invention provides a video processing apparatus as defined in Claim 6. Advantageous embodiments are defined in the subclaims.

The invention is based on the recognition that motion in saturated colored areas can be better detected on the basis of chrominance-related signals. Moreover, at least one linear combination of U and V chrominance-difference signals, and preferably a first linear combination of U and V chrominance-difference signals when the V chrominance-difference signal exceeds the U chrominance-difference signal, and a second linear combination of the U and V chrominance-difference signals in the opposite case, appears to be a very good approximation of the magnitude of the motion in the chrominance signals. While the results of even more complicated formulae can be obtained by means of a look-up table ROM, simple linear combinations can be implemented within a smaller chip area and/or by means of general purpose video processing circuitry without read-only memories.

These and other aspects of the invention will be apparent from and elucidated with reference to the embodiments described hereinafter.

BRIEF DESCRIPTION OF THE DRAWINGS

In the drawing, FIG. 1 shows an non-limitative example of an embodiment of a video processing apparatus in accordance with the present invention.

DETAILED DESCRIPTION OF THE PREFERRED EMBODIMENTS OF THE INVENTION

In FIG. 1, a U chrominance signal is delayed by a frame delay 1U whose input and output are applied to a subtracter 3U which takes the absolute value of the difference between its inputs. The output of the subtracter 3U is a chrominance-difference signal Ud which is applied to a multiplier 5 to obtain a chrominance-difference signal Ud' which equals $^{11}/_{16}$ times Ud. Further, a V chrominance signal is delayed by a frame delay 1V whose input and output are applied to a subtracter 3V which takes the absolute value of the difference between its inputs. The output of the subtracter 3V is a chrominance-difference signal Vd. The signals Ud' and Vd are applied to a comparator 7 which controls a double change-over switch 9 whose switching contacts receive the signals Ud' and Vd. A first common contact of the double change-over switch 9 is applied to a multiplier 11 which multiplies by $^{5}/_{16}$. An output of the multiplier 11 and a second common contact of the double change-over switch 9 are connected to an adder 13 which furnishes a signal M indicative of the amount of motion in the chrominance signals.

The signal M is thus calculated in accordance with the following formulae:

$M = ^{5}/_{16} \times Ud' + Vd$ when $Vd < Ud'$, and $M = Ud' + ^{5}/_{16} \times Vd$ in the opposite case, where $Ud' = ^{11}/_{16} \times Ud$, $Ud = U(t) - U(t-Tfr)$, $Vd = V(t) - V(t-Tfr)$, Tfr=frame period.

When the signal M is used to make a motion-dependent choice between an intra-field processing mode and an inter-field processing mode, in which inter-field processing mode intra-frame averages of the U and V chrominance signals are transmitted, the above-described U and V chrominance signals are preferably replaced by their intra-frame averages. This yields the advantage that in the receiver, the detection of motion in the color signals is performed on the same signals as in the encoder, independent of the processing mode selected. In the encoder, the transmitted odd and even field U chrominance signals are $U_{odd}' = a \cdot U_{ifa} + (1-a) \cdot U_{odd}$, and $U_{even}' = a \cdot U_{ifa} + (1-a) \cdot U_{even}$, where $U_{ifa} = (U_{odd} + U_{even})/2$, $U_{odd}$=odd field U chrominance input signal, $U_{even}$=even field U chrominance input signal, a=motion-dependent factor.

In the decoder, the received even and odd field signals are averaged:

$$(U_{odd}' + U_{even}')/2 = a \cdot U_{ifa} + (1-a) \cdot (U_{odd} + U_{even})/2$$
$$= a \cdot U_{ifa} + (1-a) \cdot U_{ifa}$$
$$= U_{ifa},$$

which shows that, independent of the factor a, the intra-frame average chrominance signals are available in both the encoder and the decoder, so that in the decoder, it is possible to obtain the motion-adaptive processing mode switching signal on the basis of the same signals as those used in the encoder.

It should be noted that the above-mentioned embodiments illustrate rather than limit the invention, and that those skilled in the art will be able to design many alternative embodiments without departing from the scope of the appended claims. It will be evident that alternative formulae and alternative embodiments for calculating the formulae are conceivable. For example, $Ud' = ^{3}/_{4} \times Ud$ does not lead to results which are much different from the results obtained with the above-mentioned formula, but is slightly simpler to implement (for ¾ it holds that the numerator 3 equals 2 (one shift) plus 1, whereas for $^{11}/_{16}$ it holds that the numerator 11 equals 8 (3 shifts) plus 2 (one shift) plus 1). Both factors ¾ and $^{11}/_{16}$ are approximations of 0.71 ($^{11}/_{16}$ being better than ¾), which number 0.71 is a theoretically optimal attenuation factor for Ud to give Ud' and Vd a comparable significance. The multiplication of Ud for obtaining Ud' yields the advantages that subsequently a simple comparison of Ud' and Vd suffices to control the double change-over switch 9, and the formulae for M become symmetric. The symmetry in the formulae for M yields the advantage that only one fixed multiplier 11 ($\times ^{5}/_{16}$), one adder 13 and the double change-over switch 9 controlled by the comparator 7 are required to implement both formulae. Of course, it is alternatively possible to use more, for example, 3 linear combinations of U and V chrominance-related signals, but the complexity increases with an increasing number of linear combinations used to obtain the motion signal.

We claim:

1. A method of obtaining a motion signal indicative of an amount of motion in chrominance signals, comprising the steps of:

deriving U and V chrominance-difference signals from U and V chrominance signals, and deriving at least one linear combination of said U and V chrominance-difference signals to obtain said motion signal.

2. A method as claimed in claim 1, wherein said step of deriving at least one linear combination of said U and V chrominance-difference signals includes deriving a first linear combination of said U and V chrominance-difference signals when said V chrominance-difference signal exceeds said U chrominance-difference signal, and deriving a second linear combination of said U and V chrominance-difference signals in the opposite case, to obtain said motion signal.

3. A method as claimed in claim 1, wherein said U chrominance-difference signal is the absolute difference of a present U chrominance signal and a U chrominance signal from one frame period earlier multiplied by a simple rational factor.

4. A method as claimed in claim 2, wherein said first and second linear combinations are implemented by means of a single adder and a single fixed multiplier for multiplying by a simple rational factor.

5. A method as claimed in claim 1, wherein said U and V chrominance signals are intra-frame averaged chrominance signals.

6. A video processing apparatus having an intra-field processing mode and an inter-field processing mode, in which a motion-dependent choice is made between these modes, comprising:

means for deriving U and V chrominance-difference signals from U and V chrominance signals, and means for deriving a first linear combination of said U and V chrominance-difference signals when said V chrominance-difference signal exceeds said U chrominance-difference signal, and deriving a second linear combination of said U and V chrominance-difference signals in the opposite case, to obtain a motion signal for said motion-dependent choice.

7. A method as claimed in claim 3, wherein said rational factor equals $^{11}/_{16}$.

8. A method as claimed in claim 2, wherein said rational factor equals $^{5}/_{16}$.

* * * * *